2,978,338
Patented Apr. 4, 1961

2,978,338

ANTIFOULING COATINGS

Glenn A. Greathouse, Orlando, Fla., assignor, by mesne assignments, to the United States of America as represented by the Secretary of the Navy No Drawing. Filed June 16, 1959, Ser. No. 820,834

5 Claims. (Cl. 106—15)

This invention relates to antifouling composition and more particularly to organic antienzyme antifouling agents.

Antifouling compositions are surface protecting materials, that is, materials for protecting surfaces against the attachment of marine growths. In the past the approach to this problem has been limited to the use of heavy metal toxic agents such as the salts or oxides of copper, arsenic and mercury or to the use of organic toxics such as the substituted phenols, pyridines and aldehydes. Rather than to attempt to kill the fouling organisms as was the object of the prior art compositions, the present invention merely interrupts the life cycle or enzyme system of the organism to render them incapable of producing the materials which they require to attach themselves to submerged surfaces. Thus, the compositions here disclosed are based on the idea of preventing attachment of the organisms or at least allowing but a loose or temporary attachment. Actually, killing the fouling organisms is considered harmful since these organisms will have attached themselves before dying. Once having attached themselves they remain attached to the submerged surface after death thereby permitting other fouling organisms to attach themselves to the dead organisms and remain unaffected by the toxic coating because of their distance from the surface.

The enormous savings and advantages of antifouling coatings in general and of the present invention in particular are manifest when consideration is given to the cost of drydocking and removing barnacles and old damaged paint and the cost of labor and material involved in applying a new coat of paint. Furthermore, a loss inures as a consequence of the loss of operation of the craft during time in dry dock.

It is therefore an object of the present invention to provide a novel class of compounds preventing the attachment of fouling organisms to submerged surfaces by interrupting the functioning of the enzyme systems of the fouling organisms.

It is another object to provide a laquer-base antifouling composition for coating the aluminum alloy hulls of seaplanes, such that the composition does not result in deleterious electrochemical action.

The organisms involved in marine fouling are almost endless in number depending upon the season and geographical location. Thus, in tropical or semi-tropical waters the marine organisms are present in far greater number and develop more rapidly. Also the species encountered in such waters are greater in number than in temperate waters.

Of great practical importance is the prevention of the damage to the paint film which is incurred as a result of the attachment of fouling organisms. Certain marine organisms attach themselves while in the embryonic state and while growing in place build a more or less solid base of $CaCO_3$. This calcium carbonate will actually penetrate to the base metal. Having reached the base metal the calcium carbonate deposit spreads laterally thereby inducing mechanical strains in the paint film and resulting in dislodging of portions of the paint film affected.

For this reason the present invention was evolved with the prevention of firm attachment of fouling organisms as its objective. To achieve this purpose many organic chemicals were synthesized in search of those compounds possessing antienzyme or "loose attachment" properties. Many formulations utilizing antienzyme organic chemicals were tested and were found to be of high quality and to give excellent performance for various periods of time up to 12 months. Some of these formulations are set forth below. All of these examples performed successfully in preventing firm attachment of the fouling organisms for periods of up to 12 months in the waters of the Daytona Beach Inlet. Each of the antifouling compositions indicated below are prepared by formulating the organic compounds shown into a nitrocellulose lacquer. An example of a typical nitrocellulose lacquer is a solution of pyroxylin in a suitable solvent such as butyl acetate. Other organic liquids may be employed also such as n-butyl alcohol, diamyl phthalate, ethyl acetate or isopropyl acetate among others. The particular nitrocellulose lacquer is not, however, important since it functions only as a vehicle for the antienzyme organic chemicals. A specific example of a nitrocellulose lacquer, which would be just one of many perfectly compatible to the formulation of the instant invention, may be found in U.S. Patent No. 471,422, March 22, 1892, by Hale at page 2, column 2, and composed of amyl acetate 4 gal., benzine 4 gal., methyl alcohol 2 gal., pyroxyline 2½ pounds. The compositions may then be painted onto the surfaces (preferably aluminum alloys) exposed to the marine environment.

Example 1:                              Percent by weight
    N-trichloromethyl thio tetrahydrophthalimide __ 1–3
    Octachloro-4, 7-methano tetrahydroindane ____ 1–4

Example 2:
    Octachloro-4, 7-methano tetra hydroindane ___ 1–4
    Dichlorodiphenyl trichloroethane _____ 1–3

Example 3:
    N-trichloromethyl thio tetra hydrophthalimide _ 1–3
    Octachloro-4, 7-methano tetra hydroindane ____ 1–4
    Dichlorodiphenyl trichloroethane _____ 1–3

Example 4:
    Hydantoin analog of N-trichloromethyl thio tetra
        hydrophthalimide _____ 1–3
    Octachloro-4, 7-methano tetra hydroindane ___ 1–4

Example 5:
    Octachloro-4, 7-methanotetra hydroindane ____ 2–6

Thus it can be seen that broadly speaking the formulations will be composed of a compatible vehicle and one or more antienzyme organic chemicals in the ranges shown:

Parts by weight
Vehicle component _____ 90 to 99
Antienzyme organic chemical component _____ 10 to 1

Obviously many modificaitons and variations of the present invention are possible in the light of the above teachings. It is therefore to be understood that within the scope of the appended claims the invention may be practiced otherwise than as specifically described.

What is claimed is:

1. An antifouling composition consisting essentially of 1 to 3 percent by weight N-trichloromethyl thio tetra hydrophthalimide, 1 to 4 percent by weight octachloro-4, 7-methano tetra hydroindane and the balance of said composition being nitrocellulose lacquer.

2. An antifouling composition consisting essentially of 1 to 4 percent by weight octachloro-4, 7-methano tetra hydroindane, 1 to 3 percent by weight dichlorodiphenyl trichloroethane and the balance nitrocellulose lacquer.

3. An antifouling coating for aluminum alloys consisting essentially of 1 to 3 percent by weight N-trichloromethyl thio tetra hydrophthalimide, 1 to 4 percent by weight octachloro-4, 7-methano tetra hydroindane, 1 to 3 percent by weight dichlorodiphenyl trichloroethane and the balance being nitrocellulose lacquer.

4. An antifouling composition consisting essentially of 1 to 3 percent by weight of hydantoin analog of N-trichloromethyl thio tetra hydrophthalimide, 1 to 4 percent by weight octachloro-4, 7-methano tetra hydroindane and the balance nitrocellulose lacquer.

5. An antifouling composition consisting essentially of 2 to 6 percent by weight of octachloro-4, 7-methano tetra hydroindane and the balance nitrocellulose lacquer.

References Cited in the file of this patent

UNITED STATES PATENTS 2,420,295     Biehn et al. _____ May 13, 1947

FOREIGN PATENTS 796,368     Great Britain _____ June 11, 1958